United States Patent
Goodwin et al.

(10) Patent No.: US 8,712,463 B2
(45) Date of Patent: Apr. 29, 2014

(54) WIRELESS COMMUNICATION POWER CONTROL

(75) Inventors: Graham C. Goodwin, New South Wales (AU); Daniel Quevedo, New South Wales (AU); Karl Torbjorn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 734 days.

(21) Appl. No.: 12/920,678

(22) PCT Filed: Mar. 5, 2008

(86) PCT No.: PCT/EP2008/052676
§ 371 (c)(1),
(2), (4) Date: Sep. 2, 2010

(87) PCT Pub. No.: WO2009/109229
PCT Pub. Date: Sep. 11, 2009

(65) Prior Publication Data
US 2011/0009156 A1    Jan. 13, 2011

(51) Int. Cl.
*H04B 7/00*    (2006.01)
(52) U.S. Cl.
USPC ............ 455/522; 455/69; 370/318
(58) Field of Classification Search
USPC ............ 455/69, 127.1, 522; 370/318
See application file for complete search history.

(56) References Cited

U.S. PATENT DOCUMENTS

| | | | |
|---|---|---|---|
| 6,519,449 B1* | 2/2003 | Zhang et al. | 455/69 |
| 6,963,752 B1* | 11/2005 | Nilsson | 455/522 |
| 2008/0214224 A1* | 9/2008 | Ostman et al. | 455/522 |

FOREIGN PATENT DOCUMENTS

EP    1873935 A1    1/2008

OTHER PUBLICATIONS

Goodwin et al., "Architectures and Coder Design for Networked Control Systems", Automatica, Pergamon, vol. 44, No. 1, Jan. 1, 2008, pp. 248-257, XP022411157.

* cited by examiner

*Primary Examiner* — Raymond Dean
(74) *Attorney, Agent, or Firm* — Rothwell, Figg, Ernst & Manbeck, P.C.

(57) ABSTRACT

For power control in a wireless communication system, a node comprises means for obtaining power of signals received over a wireless signal channel and a power control signal unit. The power control signal unit (21) provides power control signals intended for the power control over the channel. A warper unit warps the power control signals by a first filter. A quantizer quantizes the warped power control signals, which are transferred to another node in the wireless communication system. The receiving node comprises a dewarper, dewarping the received signals by a second filter. The power control of the wireless signal channel is performed based on the dewarped power control signal. The filters are linear filters arranged for reducing an influence of quantization. The second filter is an inverse filter with respect to the first filter. The filters are preferably adapted by adaptors.

39 Claims, 4 Drawing Sheets

WIRELESS COMMUNICATION POWER CONTROL

CROSS-REFERENCE TO RELATED APPLICATION

This application is a 35 U.S.C. §371 National Phase Entry Application from PCT/EP2008/052676, filed Mar. 5, 2008, and designating the United States.

TECHNICAL FIELD

The present invention relates in general to wireless communication and in particular to power control in wireless communication systems.

BACKGROUND

Power control is used in cellular systems to enhance performance, in order to compensate for variations in the channel power gains, e.g. by suppressing fading effects of various kinds. In WCDMA (Wideband Code Division Multiple Access) systems, in the uplink, this is achieved by measurements (or estimation) of the signal to interference ratio (SIR) in the base station receiver. These measurements are compared to a reference SIR, and based on this information the base station computes power control commands at a rate of 1500 Hz which are transmitted to the terminal. The terminal adjusts its output power accordingly and the process is repeated.

Since the actuator and the output measurement are located at different locations (RBS and terminal for downlink, terminal and RBS for the uplink), a complication is that power control commands must necessarily be transmitted over the control channel. The power control commands are therefore subject to degradation due to fast fading, interference and noise, a fact which makes the received commands uncertain to varying degrees. Good reviews of fast power control for WCDMA can e.g. be found in H. Holma and A. Toskala, "WCDMA for UMTS—Radio Access for Third Generation Mobile Communications", Chichester, UK: Wiley, 2000, pp. 34, 109, and in section 9.2.

In WCDMA, the design of the control loop is based on a number of simplifications. Transmission errors are not accounted for, i.e. the transmitted control signal is equivalent to the received control signal. No disturbance modelling is exploited. As a consequence the currently used scheme is not optimal in case the disturbances are coloured.

Furthermore, a limitation in present systems is that the bit rate available for control purposes is very limited to keep the over-head consumption of bit-rates low. A key aspect of the power control problem is that each power adjustment command needs to be digitized. Thus, it is constrained to be represented by a small number of bits. In existing WCDMA designs, the discrete time power control signals therefore represent power increments. The inner-loop controller sends a value associated with the difference in achieved and targeted SIR estimates, which is then quantized. Typically, each value needs to be expressed via 1 bit, in which case the range of the increments has only two elements. The control signal thereby gives an order of increasing or decreasing the power one step. Typically, a saturation block will limit the available maximum power.

The restriction to use only 1 bit (or a few bits) will limit the efficiency of the power control. In certain situations, the one-step increment may be too small to compensate for fast variations in gain. On the other hand, if constant conditions prevail, alternating increments and decrements result in non-optimum utilization of the signalling resources. A consequence of that is that the performance of e.g. the WCDMA fast power control loop is not as good as it could be.

SUMMARY

An object of the present invention is to provide devices and methods for power control in wireless communication systems which utilize the signalling resources more efficiently.

The above object is achieved by methods and devices according to the enclosed patent claims. In general words, in a first aspect, a method for power control in a wireless communication system comprises obtaining of received signal power of signals transmitted over a wireless signal channel and providing of power control signals intended for power control of transmission over the wireless signal channel for obtaining a first targeted signal to interference level, based on the obtained received signal power. The power control signals are warped into warped power control signals by a first filter. The first filter is a linear filter arranged for reducing an influence of quantization noise on the use of the power control signals. Signals based on the power control signals, i.e. the warped power control signals, are quantized into quantized power control signals and the quantized power control signals are transmitted over a wireless control channel. A transmission power for the quantized power control signals over the wireless control channel is controlled to obtain a second targeted signal to interference level.

In a second aspect, a method for power control in a wireless communication system comprises receiving of quantized power control signals over a wireless control channel, where a transmission power for the quantized power control signals received over the wireless control channel are controlled to obtain a second targeted signal to interference level. The received quantized power control signals are warped and quantized power control signals, filtered by a first filter. The warped and quantized power control signals are dewarped into power control signals by filtering with a second filter. A transmission power for signals transmitted over a wireless signal channel is controlled in response to the received quantized power control signals for obtaining a first targeted signal to interference level. The first and second filters are linear filters arranged for reducing an influence of quantization noise on the controlling of the transmission power for signals transmitted over the wireless signal channel. The second filter is an inverse filter with respect to the first filter.

In a third aspect, a method for power control in a wireless communication system comprises obtaining, in a first node of the wireless communication system, received signal power of signals transmitted from a second node of the wireless communication system over a wireless signal channel. Power control signals intended for power control of transmission over the wireless signal channel for obtaining a first targeted signal to interference level are provided based on the obtained received signal power. The power control signals are warped in the first node into warped power control signals by a first filter. The warped power control signals are quantized into quantized power control signals, and the quantized power control signals are transferred over a wireless control channel from the first node to the second node. A transmission power for the quantized power control signals over the wireless control channel is controlled in the first node to obtain a second targeted signal to interference level. In the second node, the received warped and quantized power control signals are dewarped into power control signals by filtering the received warped and quantized power control signals by a second filter. A transmission power for signals transmitted over the wireless signal channel is controlled in said second node, in response to the dewarped power control signals. The first and second filters are linear filters arranged for reducing an influence of quantization noise of the controlling of the transmission power for signals transmitted over the wireless signal channel. The second filter is an inverse filter with respect to the first filter.

In a fourth aspect, a node for use in a wireless communication system comprises a controller device, arranged for power control of wireless channels in the wireless communication system. The controller device comprises a receiver power control section, which in turn comprises means for obtaining received signal power of signals received over a wireless signal channel of the wireless communication system and a power control signal unit connected to the means for obtaining received signal power. The power control signal unit is arranged for providing power control signals intended for power control of transmission over the wireless signal channel for obtaining a first targeted signal to interference level. The receiver power control section further comprises a warper unit connected to the power control signal unit. The warper unit comprises a first filter and is arranged for warping the power control signals into warped power control signals by the first filter. A quantizer is connected to a warper unit and is arranged to quantize the warped power control signals into quantized power control signals. A transmitter connected to the receiver power control section and arranged for transmitting the quantized power control signals over a wireless control channel of the wireless communication system. The controller device further comprises a transmitter power control section connected to the transmitter being arranged for controlling a transmission power for the quantized power control signals over the wireless control channel to obtain a second targeted signal to interference level. The first filter being a linear filter arranged for reducing an influence of quantization noise on the use of said power control signals.

In a fifth aspect, a node for use in a wireless communication system comprises a receiver arranged for receiving quantized power control signals over a wireless control channel of the wireless communication system and a controller device connected to the receiver and arranged for power control of wireless channels in the wireless communication system. The controller device comprises a transmitter power control section, being arranged to control a transmission power for signals transmitted over a wireless signal channel in response to the received power control signals for obtaining a first targeted signal to interference level. The received power control signals are warped and quantized power control signals, filtered by a first filter. The transmitter power control section further comprises a dewarper unit, comprising a second filter and being arranged for dewarping the power control signals into the dewarped power control signals by the second filter. The first and second filters are linear filters arranged for reducing an influence of quantization noise on the controlling of the transmission power for signals transmitted over the wireless signal channel. The second filter is an inverse filter with respect to the first filter. A transmission power for the quantized power control signals received over the wireless control channel is controlled to obtain a second targeted signal to interference level.

In a sixth aspect, a wireless communication system comprises at least one first node according to the fourth aspect and at least one second node according to the fifth aspect.

One advantage of the invention is that a better power control performance is obtained compared to what is achieved without the disclosed technology. The robustness to erroneous modelling also appears to improve. The presently available power controllers, e.g. in WCDMA do not need to be completely re-designed. Note, however, that since terminals are affected UE capability information may need to be enhanced though.

BRIEF DESCRIPTION OF THE DRAWINGS

The invention, together with further objects and advantages thereof, may best be understood by making reference to the following description taken together with the accompanying drawings, in which.

DETAILED DESCRIPTION

As a model system for describing the present invention, inner-loop uplink power control in a WCDMA system is used. Although the invention is exemplified by the WCDMA fast power control scheme, it is not limited to this application. The invention is applicable in all communication networks using power control. Furthermore, the invention is applicable in the uplink as well as in the downlink.

The power controlled channels support various services. Each service typically requires a certain maximal bit or block error rate, for successful operation. Given the bit rate of the service, these maximal error rates can be transformed to requirements on SIR for each service. A consequence is that the power control loop is normally designed to maintain a reference value of the SIR. Since the actuator controls transmit power, the SIR value is usually transformed to a desired channel power value by the equation $$SIR_{Ref} = \frac{P_{Ref}^{Channel}}{P^{Total} - P_{Ref}^{Channel}} \Leftrightarrow P_{Ref}^{Channel} \qquad (1)$$
$$= \frac{SIR_{Ref}}{1 + SIR_{Ref}} P^{Total}.$$

Figure 1:
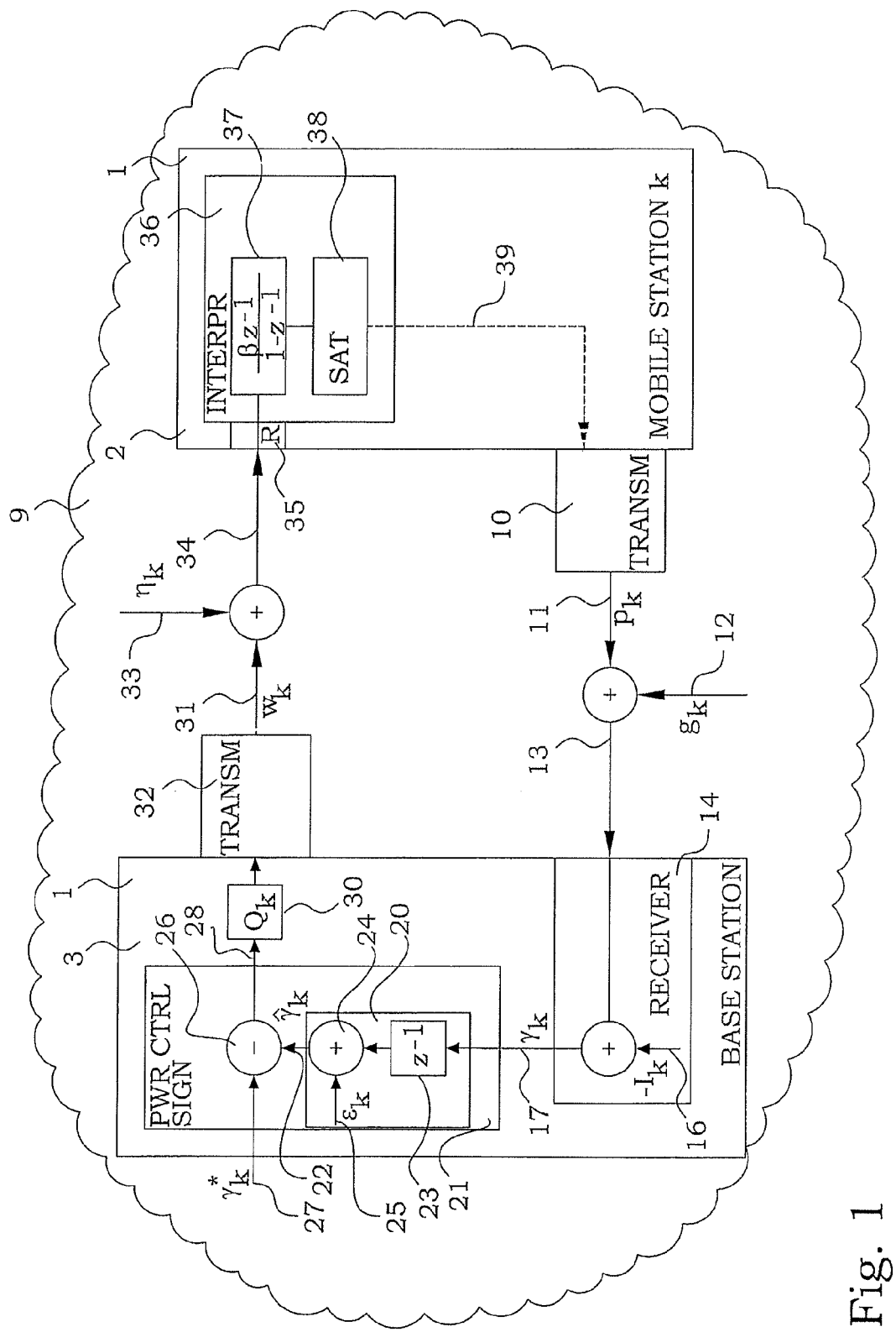
FIG. 1 is a of a conventional WCDMA power control set-up.

A block diagram of the presently applied fast power control scheme in WCDMA appears in FIG. 1. In a wireless communication system 9, a node 1, in this case a mobile station 2, k, transmits by a transmitter 10 an uplink signal 11 with a power of $p_k$. After experiencing a channel gain 12 (logarithmic domain), $g_k$, the affected uplink signal 13 is received by a receiver 14 in another node 1, in this case a base station 3. The received uplink signal 13 is furthermore influenced by interference 16 from other users, $I_k$, and the total received signal 17 has a signal-to-interference ratio (SIR) of $\gamma_k$. In an estimator 20 of a power control signal unit 21, an estimation 22, $\hat{\gamma}_k$, of the signal-to-interference ratio is obtained. This is made by taking a slot delay 23 into account and considering the actual estimation 24 as an addition of estimation noise 25, $\epsilon_k$. The estimated signal-to-interference ratio 22 is compared 26 with a target SIR 27, $\gamma^*_k$, for producing a control signal 28. The control signal 28 is quantized in a quantizer 30 into a quantized control signal 31, $w_k$, transmitted by a transmitter 32 to the mobile station 2. The quantized control signal 31 experiences down-link channel noise 33, $\eta_k$, giving a received controlled signal 34. The received controlled signal 34 is received in a receiver 35 and processed in an interpreter 36. The interpreter 36 can be considered to involve an integrator 37, having an integrator gain of β, and a saturation block 38. The output of the interpreter 36 is instructions 39 for the transmitter 10 to adjust the transmit power $p_k$ for coming uplink transmissions.

A more detailed description of the mathematical background can be found in Appendix A.

In traditional control, it is commonly assumed that the interconnection between the plant and the controller is transparent, i.e. the transmitted signals are equivalent to received signals. Whenever the transparent assumption is not valid any more, the problem of control is commonly denoted a networked control system (NCS) problem. For power control purposes, the noise $\eta_k$ added to the control signals is in most cases relatively low and may in typical cases be neglected. A NCS approach is therefore not very likely to give any large advantages when applied to solely transmission noise.

However, when studying FIG. 1 more carefully, it can be noted that the quantizer $Q_k(\bullet)$ is appearing in the path between the comparison of the targeted and estimated SIR and the interpreter. The operation of the quantizer is to provide an output which in a "best" way represents the difference in SIR using the available bits. According to the present invention, a different way to treat the quantizer is to consider it as a source of noise, added to the SIR difference in order to result in the final control signal $w_k$. An NCS approach can then be utilized, by defining noise influencing a control signal to also comprising quantisation noise of a quantizer.

A special approach to a general NCS has been proposed by G. C. Goodwin et al in "Architectures and Coder Design for Networked Control Systems", Automatica, vol. 44, No. 1, pp. 348-257, January 2008. A novel architecture for NCS is introduced. In particular for SNR constrained channels, it is shown how to compute a pre-coder and a de-coder so that the variance of the error is minimized. The design accounts for a dynamic plant model, a dynamic controller model, correlation properties of disturbances and the signal to noise ratio of the channel.

The technique is based on a number of assumptions. The nominal controller, before any dynamic pre-coding/de-coding is applied, should be linear and known. The nominal plant, before any dynamic pre-coding/de-coding is applied, should be linear and known. These conditions are met by a power control system according to the present invention. The controller commands used are power up/down, i.e. the power level is differentiated. The actuator integrates the received increment information to achieve an output power level.

An additional request to achieve a best performance is also that dynamic models of disturbances affecting the channel and the nominal plant are available. This assumption is not automatically met by a power control system as such, since measurements of the self-correlation of disturbances and reference signals may not be available. There are two options to meet these objectives, in order to improve the operation. One is to perform off-line measurements and apply a nominal design. Another is to apply adaptive estimation to derive the sought quantities on-line. This can preferably be performed on a frame to frame basis. Such adaptive schemes may also need to address quantization effects.

The conclusion of the above discussion is that the pre-coder/de-coder concept would be possible to be applied to the cellular power control problem, where the quantizer is defined as a noise source.

In G. C. Goodwin et al, a "pre-coder" and a "de-coder" are described. However, in cellular communication systems, the term "coder" is utilized in many different respects, and introducing pre-coders and de-coders according to [2] could be quite confusing for the reader. Furthermore, a quantizer may also be considered as a "coder". In order to clearly distinguish between the different features in the present disclosure, we use the terms "quanitzer" and "quantizing" to denote the conversion of the SIR difference into the digital power control message. Furthermore, the "pre-coder" and "de-coder" as taken from G. C. Goodwin et al are in the present invention instead denoted as a "warper" and "de-warper", respectively, and the corresponding operations as "warping" and "de-warping", respectively.

Figure 2:
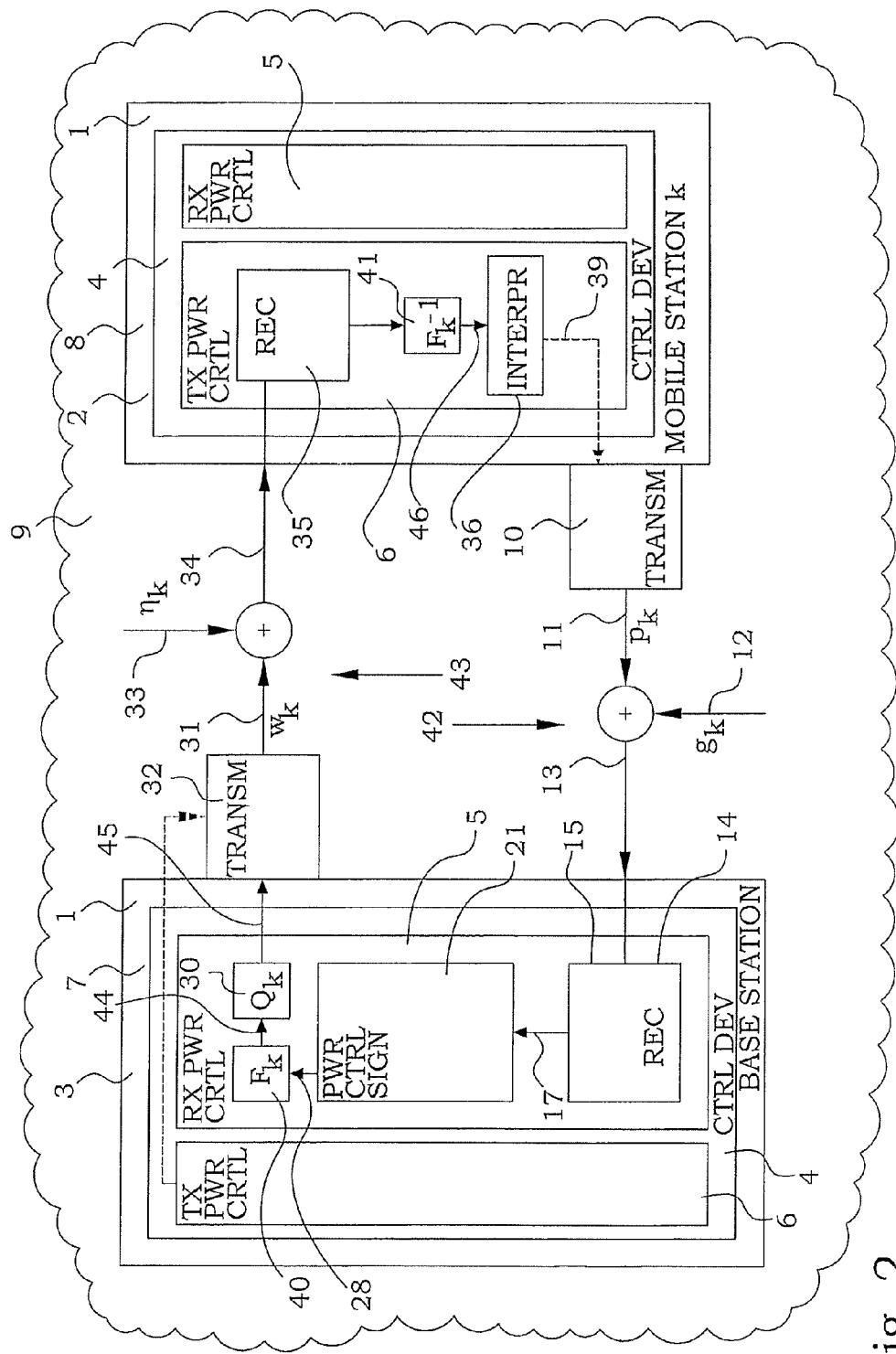
FIG. 2 is a block scheme of an embodiment of a power control system according to the present invention.

FIG. 2 illustrates a block scheme of an embodiment of a power control system according to the present invention. A node 1 for use in a wireless communication system 9 is arranged as a power control signal providing node 7. The power control signal providing node 7, is in the present embodiment a base station 3. The base station 3 comprises a controller device 4, arranged for power control of wireless channels 42, 43 in the wireless communication system 9. The controller device 4 comprises a receiver power control section 5, handling power control of signals 13 received in the node 1. The receiver power control section 5 in turn comprises means 15 for obtaining received signal power of signals 13 received over a wireless signal channel 42 of the wireless communication system 9. In the present embodiment, the means 15 for obtaining received signal power is constituted by the receiver 14 itself. In alternative embodiments, the means 15 for obtaining received signal power may instead be connected, directly or indirectly, to the receiver for obtaining required information. The means 15 for obtaining received signal power may also be arranged in other alternative ways for indirectly determining signal powers of the wireless signal channel 42.

A power control signal unit 21 is connected to the means 15 for obtaining received signal power. The power control signal unit 21 is arranged to provide power control signals 28 intended for power control of transmission over the wireless signal channel 42 in order to obtain a certain targeted signal to interference level. The power control signal unit 21 may e.g. be designed according to what is shown in FIG. 1.

According to the present invention, the receiver power control section 5 further comprises a warper unit 40 connected to the power control signal unit 21. The warper unit 40 comprising a first filter and is arranged for warping the power control signals 28 from the power control signal unit 21 into warped power control signals 44 by the first filter. The first filter is a linear filter arranged for reducing an influence of quantization noise on the use of the power control signals 28. In other words, the effects of the quantization errors can be mitigated by on purpose distorting the power control signals 28.

Warping of the power control signals, according to the present invention, reduces the use of the wireless control channel to mitigate the SIR tracking error caused by quantization effects. The combination of first and second filters makes the quantization more efficient whilst, at the same time, ensuring that the signal component is received with minimal distortion. This is achieved by preferably taking into account dynamics of the communication channel gain, target SIR, interference from other users and SIR estimation noise.

The receiver power control section 5 further comprises a quantizer 30. The quantizer 30 is connected to the warper 40, i.e. indirectly connected to the power control signal unit 21. The quantizer 30 is arranged to quantize signals based on the power control signals, in the present embodiment the warped power control signals 44, into quantized power control signals 45. The quantized power control signals 45, are transmitted over a wireless control channel 43 of the wireless communication system 9 by means of a transmitter 32, connected to the receiver control section 5. The controller device 4 further comprises a transmitter power control section 6 connected to the transmitter 32. The transmitter power control section 6 is arranged for controlling a transmission power for the quantized power control signals 32 over the wireless control channel 43 to obtain a second targeted signal to interference level. This power control of the wireless control channel 43 can be performed either according to the principles presented in the present invention or by any conventional control mechanism.

The quantized power control signals 32 are transferred over the wireless control channel 43 to another node 1 of the wireless communication system 9, arranged as a power control signal receiving node 8. The power control signal receiving node 8, is in the present embodiment a mobile station 2. The power control signal receiving node 8 comprises a receiver 35, which is arranged for receiving quantized power control signals 34 after being transferred over the wireless control channel 43 of the wireless communication system 9. The power control signal receiving node 8 also comprises a controller device 4 connected to the receiver 35. The controller device 4 is arranged for power control of wireless channels in the wireless communication system 9. The controller device 4 comprises a transmitter power control section 6, which possibly in turn comprises the receiver 35. The transmitter power control section 6 is arranged to control a transmission power of a transmitter 10 for signals 11 transmitted over a wireless signal channel 42 in response to received quantized power control signals 34 for obtaining the first targeted signal to interference level.

According to the present invention, the transmitter power control section 6 of the power control signal receiving node 8 also comprises a dewarper unit 41, connected to the receiver 35. The dewarper unit 41 comprises a second filter and is arranged to dewarp the received power control signals into dewarped power control signals by means of the second filter. The second filter is also a linear filter arranged for reducing an influence of quantization noise. The second filter is an inverse filter to the first filter. The second filter will thereby restore the distortions produced by the first filter and give a dewarped power control signal 46 that is less affected by quantization noise. The dewarped power control signal 46 is used for producing a control of the transmission power of the transmitter. In the present embodiment, this is performed by an interpreter 36, e.g. according to the principles illustrated in FIG. 1.

In FIG. 2, two filters are introduced, in the warper and dewarper, respectively, i.e. one in the power control signal providing node 7 and one in the power control signal receiving node 8. The filters are inverse filters to each other, i.e.:

$$F^*(z)F_k^{-1}(z)=1, \qquad (2)$$

where $F_k(z)$ and $F_k^{-1}(z)$ are the first and second filters, respectively, and z is a transform variable.

The invention is inspired by the WCDMA fast power control scheme, but it is not limited to this application. Any wireless communication system having power control schemes based on power control signals signalled between the nodes may benefit from the present invention. The embodiment of FIG. 2 is an embodiment, where the power control concerns the uplink signal traffic, i.e. from the mobile station to the base station. However, the invention can also be applied in the opposite direction, i.e. concerning power control of downlink signal traffic from the base station to the mobile station. In such a case, the mobile station constitutes the power control signal providing node 7 and the base station constitutes the power control signal receiving node 8.

Figure 3:
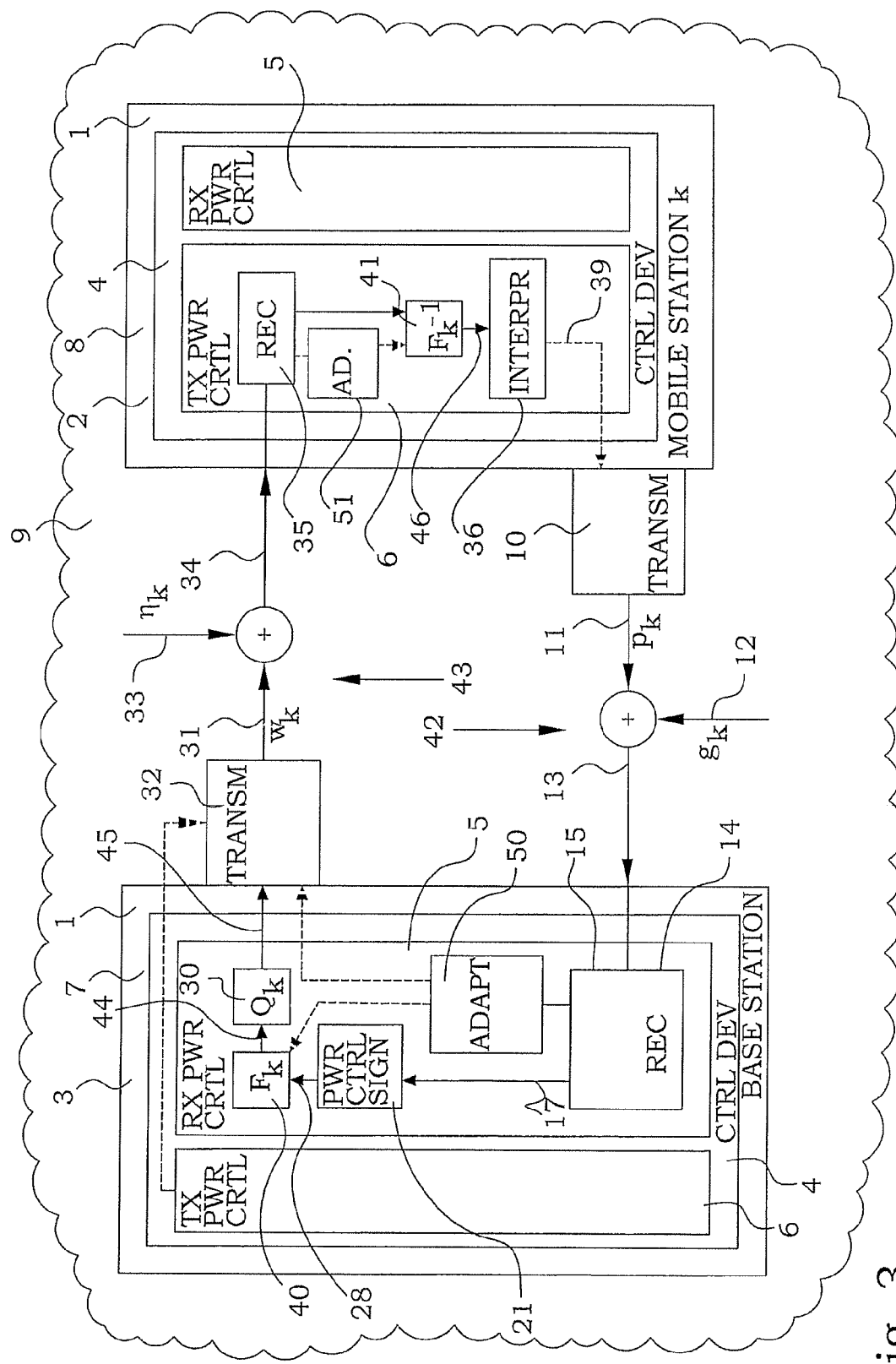
FIG. 3 is a block scheme of another embodiment of a power control system according to the present invention.

In some applications, fixed filters may operate well. However, in a general case, it is probable that the properties of the wireless signal channel vary in time. It is thus preferred to provide for an adaptation of the filters, preferably depending on channel properties of the wireless signal channel. In FIG. 3, another embodiment of a power control system according to the present invention is illustrated. Here, the receiver power control section 5 of the power control signal providing node 7 comprises a filter adaptor 50. The filter adaptor 50 is connected to the warper unit 40. The filter adaptor 50 is arranged to adapt the first filter to channel properties of the wireless signal channel 42. The channel properties can be obtained from any source, or by direct detection by the filter adaptor itself. However, since channel properties at least to a part already are available within the node, in a preferred embodiment, the filter adaptor 50 is also connected to the means 15 for obtaining received signal power. The filter adaptor 50 is preferably arranged for obtaining a channel model of a channel gain 12 of the wireless signal channel 42. Based on this channel model, the first filter is calculated for reducing the influence of the quantization noise.

The filter adaptor 50 is in this embodiment further arranged for calculating also the second filter to be used by the receiver of the power control signals. Such calculation may be performed by the receiver itself or by any third party, but since the first and second filters are intended to be inverse filters, the calculation of the second filter becomes easiest and most reliable if it is performed in conjunction with the calculation of the first filter. In such an embodiment, the filter adaptor 50 is further connected to the transmitter 32. The transmitter 32 is arranged for signalling data representing the second filter to the receiver of the power control signals. The representation of the second filter may comprise data concerning the second filter itself. Alternatively, the representation may represent a channel model of the wireless signal channel 42.

In a further preferred embodiment, the filter adaptor comprises an estimator estimating a dynamic model of channel gain from the received signal power. The estimation can further also incorporate a model of interference of other users to the wireless signal channel, as well as a model of the first targeted signal to interference ratio.

In another embodiment, the filter adaptor is arranged to operate according to a trial-and-error approach. In one such approach, a set of filters is predefined. The different filters are tried and the outcome is measured. The most advantageous filter is then selected. This approach can also be expanded by selecting the set of possible filters e.g. based on channel properties of the wireless signal channel 42.

At the power control signal receiving node 8, the transmitter power control section further comprises a filter adaptor 51, connected to the dewarper unit 41. The filter adaptor 51 is arranged for adapting the second filter to channel properties of the wireless signal channel 42. The filter adaptor 51 may perform the filter calculations, or may obtain data representing the second filter from elsewhere. In a preferred embodiment, the receiver 35 of the power control signal receiving node 8 is further arranged for receiving such a representation of the second filter over the wireless communication system 9. The filter adaptor 51 is then connected to the receiver 35 to obtain such representation. The filter adaptor 51 is arranged for adapting the second filter based on the received representation of the second filter. The representation of the second filter may comprise data concerning the second filter itself. Alternatively, the representation may represent a channel model of the wireless signal channel 42. The filter adaptor 51 then has to be further arranged for calculating the second filter based on the achieved channel model.

The signalling of data representing the second filter from the first to the second node will occupy some signalling resources. However, if the adaptation rate of the filters is much slower than the power control loop, the additional signalling will still be small compared to any solution based on an increased number of quantization bits.

Figure 4:
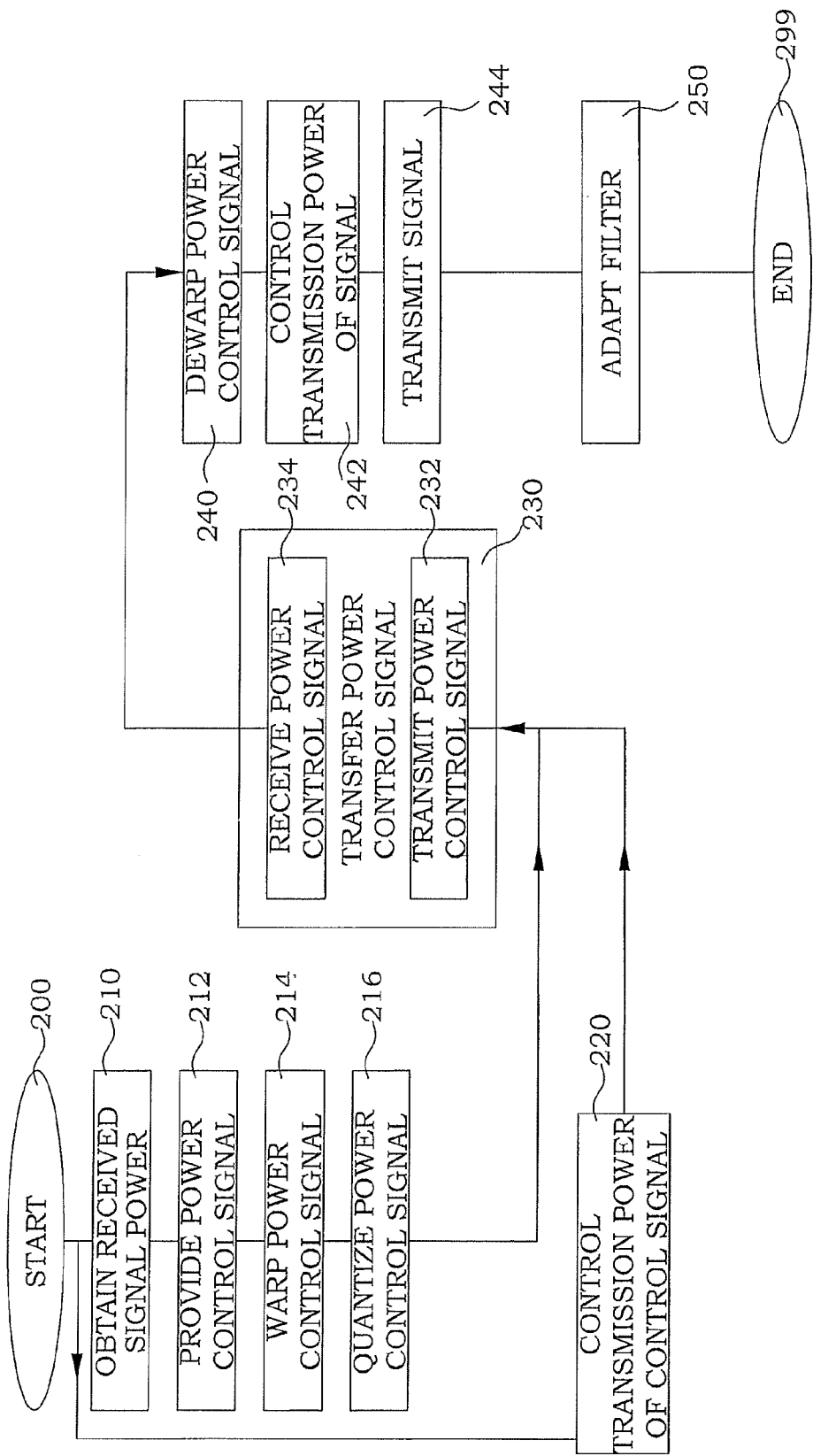
FIG. 4 is a flow diagram of steps of an embodiment of a power control method according to the present invention.

FIG. 4 illustrates a flow diagram of steps of an embodiment of a method according to the present invention. A method for power control in a wireless communication system begins in step 200. In step 210, received signal power of signals transmitted over a wireless signal channel is obtained. Power control signals intended for power control of transmission over the wireless signal channel for obtaining a first targeted signal to interference level are provided in step 212 based on the obtained received signal power. In step 214, the power control signals are warped into warped power control signals by a first filter. The first filter is a linear filter arranged for reducing an influence of quantization noise on the use of the power control signals. Signals based on the power control signals, in this embodiment the warped power control signals, are in step 218 quantized into quantized power control signals.

In step 230, the quantized power control signals are transferred over a wireless control channel from a first node to a second node. This step in turn comprises the step 232 of transmitting the quantized power control signals over the wireless control channel, and the step 234 of receiving quantized power control signals over the wireless control channel. A transmission power for the quantized power control signals over the wireless control channel is controlled in step 220 to obtain a second targeted signal to interference level.

In the receiving node, in step 240, the warped and quantized power control signals are dewarped by filtering with a second filter. The second filter is a linear filter arranged for reducing an influence of quantization noise on the controlling of the transmission power for signals transmitted over the wireless signal channel. The second filter is an inverse filter to the first filter. In response to the received and dewarped quantized power control signals, a transmission power for signals transmitted over the wireless signal channel is controlled in step 242 for obtaining the first targeted signal to interference level. In step 244, signals are transmitted over the wireless signal channel, utilizing the controlled transmission power.

In step 250, the first and second filters are adapted to channel properties of the wireless signal channel. This can be performed in different ways, as discussed further above. The adaptation can be performed continuously or intermittently. The procedure ends in step 299.

The detailed design of warpers/de-warpers for the cellular control loop is described in Appendix B. A warper-dewarper frequency response satisfies preferably:

$$|F_k(e^{j\omega})| = B_k^{-1} \sqrt{\left|\frac{1}{(e^{j\omega}-1)\Delta_k(e^{j\omega})}\right|}, \forall \omega \in [-\pi, \pi],$$ (3)

$$|F_k^{-1}(e^{j\omega})| = B_k \sqrt{|(e^{j\omega}-1)\Delta_k(e^{j\omega})|}, \forall \omega \in [-\pi, \pi],$$ (4)

where $B_k$ is a positive real number and where $|\Delta_k(e^{j\omega})|^2$ is the power spectral density of:

$$\delta_k \triangleq \gamma^*_k + g_k + I_k + \epsilon_k.$$ (5)

The above design choice can be motivated by using linear analysis techniques. The proposal is optimal if $v_k$ and $Q_k(\cdot)$ are such that a linear quantization model holds. In that case, it turns out that the choice of $B_k$ will not affect power control performance. If the linear quantization model does not hold, e.g. in the 1-bit case implemented in current WCDMA technology, then $B_k$ constitutes a tuning parameter.

In case of an adaptive situation, this calculation will need to be repeated at the rate of adaptation.

A simulation on an inner-loop power control situation has been carried out adopting a model discrete-time channel fading. The sampling frequency was chosen as 1.5 kHz. The interference from other users and noise is taken as a zero-mean white i.i.d. (independently and identically distributed) Gaussian noise process. The SIR estimation error was modelled via a zero-mean white i.i.d. Gaussian noise process. The SIR reference signal was modelled as a zero-mean white i.i.d. Gaussian process with a sampling rate of 50 Hz. Control commands were restricted to increase or decrease by 1 dB. Performance gains in the order of 10% to 30% in the logarithmic scale were found, when compared to present WCDMA control algorithms.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX A

A single mobile station connected to a single base station will be considered.

The channel gain is, in general, time varying and can be modelled, adopting a discrete-time framework and denoting the sampling instants via l∈N, via $$\bar{g}(l) = \bar{g}^{ls}(l)\bar{g}^{ss}(l)$$ (A1)

where $\bar{g}^{ls}(l)$ refers to large scale fading, while $\bar{g}^{ss}(l)$ denotes small scale fading. Equation (A1) can be rewritten in dB via:

$$g(l) = g^{ls}(l) + g^{ss}(l).$$ (A2)

Here and in the sequel, variables in dB do not have bars. For example, $g(l)$ in (A2) is related to $\bar{g}(l)$ in (A1) by $g(l)=10\log_{10}(\bar{g}(l))$. The two fading types will be described here below.

Large scale fading represents the average signal power attenuation, i.e. fading due to movement over large areas. It is caused by distance-dependent propagation loss and by electromagnetic shadowing by large objects. It can be modelled via:

$$\bar{g}^{ls}(l) = \frac{D}{(\bar{r}(l))^\alpha} \bar{S}(l),$$ (A3)

where D is a constant, $\bar{r}(l)$ is the distance between the mobile and the base station and α is the path loss exponent. The latter depends upon the type of terrain. In free space, the path loss exponent is α=2. If reflection of a ground plane is incorporated, then α=4.

The term $\bar{S}(l)$ encompasses shadowing effects. These are spatially correlated. For a mobile station moving at velocity v, this motivates to model $\bar{S}=\{\bar{S}(l)\}$ as a non-white stochastic process. A first order discrete-time model may be used for shadow fading (in dB):

$$\bar{S}(l+1) = aS(l) + \varsigma(l),$$ (A4)

$$a = \exp\left(\frac{vT}{X}\right),$$

where $\varsigma(l)$ is zero-mean white Gaussian noise of variance $(1-a^2)\sigma^2$. T is the sampling period, and the parameters X and $\sigma$ depend upon characteristics of the wireless environment.

Small scale fading is caused by small changes in mobile station position. It is a consequence of multiple signal path components arriving at the receiver simultaneously. Depending on their phase, these may interfere either constructively or destructively. Multi-path fading manifests itself in time-spreading of the signal transmitted and, for moving mobile stations, in time variant behaviour of the channel. Small scale fading has been modelled via stochastic models. More precisely, nonline-of-sight paths are commonly characterized via Rayleigh distributions, whereas line-of-sight paths are described via Ricean distributions. Spatial correlations can also be incorporated.

Some basic aspects of WCDMA power control will now be described. A single base station provides service to K mobile stations. Focus will be on the uplink and the channel gain at time $l \in N$ (in linear scale) between the mobile station k and the base station is denoted via:

$$\bar{g}_k(l), k \in \{1,2,\ldots,K\}.$$ (A5)

Thus, if each mobile station k transmits with power $\bar{p}_k(l)$, then at time l, the base station will receive a signal of power:

$$\sum_{K=1}^{K} \bar{g}_k(l)\bar{p}_k(l) + \bar{n}(l),$$ (A6)

where $\bar{n}(l)$ denotes thermal noise. In a CDMA system, all mobile stations share the same frequency band. Thus, multiple-access interference will produce occasional transmission errors and affect the users' quality of service. To examine the communication link for mobile station k, the power of the desired signal is defined via:

$$\bar{C}_k(l) \triangleq \bar{g}_k(l)\bar{p}_k(l),$$ (A7)

and the interference from other users and noise via $$\bar{I}_k(l) \triangleq \sum_{j \neq k, 1 \leq j \leq K} \theta_j \bar{g}_j(l)\bar{p}_j(l) + \bar{n}(l),$$ (A8)

where $\theta_j$ represents the cross-correlation between the codes used by mobile stations j and k. A useful measure of the perceived signal quality for user k is the signal-to-interference ratio (SIR), defined as:

$$\bar{\gamma}_k(l) \triangleq \frac{\bar{C}_k(l)}{\bar{I}_k(l)} = \frac{\bar{g}_k(l)\bar{p}_k(l)}{\sum_{j \neq k, 1 \leq j \leq K} \theta_j \bar{g}_j(l)\bar{p}_j(l) + \bar{n}(l)},$$ (A9)

which can be rewritten in dB via:

$$\gamma_k(l) = C_k(l) - I_k(l) = g_k(l) + p_k(l) - I_k(l).$$ (A10)

The main goal of uplink power control in WCDMA is to make all signals $\{\gamma_k\}, k \in \{1,2,\ldots,K\}$ follow prescribed target trajectories. For that purpose, the base station sends K power control signals, $\{w_k\}$, to the mobile stations. Upon receipt, these update their power levels, $\{p_k\}$, accordingly.

In current WCDMA technology a cascade control architecture is adopted. Here, a slow outer loop provides target SIR trajectories, $\{\gamma^*_k\}, k \in \{1,2,\ldots,K\}$ for K fast inner loops. The outer loop typically operates at 10-100 Hz. It essentially handles slow fading. On the other hand, the inner loops have a sampling frequency of 1.5 kHz, which is sufficient for fast fading at low to moderate speeds. In the inner power loops, the interference from other users and noise are regarded as exogenous signals, c.f. FIG. 1. To take account of possible errors in the power control signal transmission, a down-link channel noise process $\eta_k$ is included.

To keep bit-rates low, in existing designs the discrete time signals $\{w_k\}$ represent power increments. More precisely, the k-th inner loop controller sends:

$$w_k(l) = Q_k(\gamma^*_k(l) + \hat{\gamma}_k(l)), l \in N,$$ (A11)

where $\hat{\gamma}_k(l)$ is an SIR estimate and where $Q_k(\bullet)$ has only two elements. At the k-th mobile station, the power signals $p_k$ is computed by passing the received signal $w_k + \eta_k$ through an integrator with a time delay of one WCDMA slot (⅔ ms) and through a limiter. We can now see that the inner loop controllers amount to quantized integrators with saturation. At the base station, SIR estimates are obtained with a one WCDMA slot delay. The associated estimation noises are denoted by $\{\epsilon_k\}$. The resultant loop is shown in FIG. 1.

APPENDIX B

Focus will be on the control loop for user k and the subscript will therefore be dropped in all signals. Furthermore, errors in the power control signal transmission will be neglected in the design below, i.e. $\eta = 0$. However, inclusion of nonzero values can also be carried out. To analyse the power control loop of FIG. 2, a linear quantization model is adopted:

$$Q(v) = v + q,$$ (B1)

where q is exogenous white noise with variance $\Phi_q$. This variance is related to that of v via:

$$\Phi_q = \frac{1}{\kappa}\Phi_v,$$ (B2)

where $\kappa$ is determined by the quantizer. To be more precise, $\kappa$ is the signal-to-noise ratio of the quantizer. It depends upon the distribution of v and on the output set of $Q(\bullet)$ and should not be confused with the SIR of user k defined in (A9).

Since the warper and dewarper are inverse to each other, then direct calculations yield that the loop in FIG. 2 can be described via:

$$\gamma = \frac{\beta z}{z^2 - z + \beta}\gamma^* + \frac{z(z-1)}{z^2 - z + \beta}(g - I) + \frac{\beta z}{z^2 - z + \beta}F^{-1}(z)q - \frac{\beta z}{z^2 - z + \beta}\varepsilon.$$ (B3)

Thus, the tracking error:

$$e \triangleq \gamma^* - \gamma$$ (B4)

satisfies:

$$e = \frac{z^2-(1+\beta)z+\beta}{z^2-z+\beta}\gamma^* - \frac{z(z-1)}{z^2-z+\beta}(g-I) - \frac{\beta z}{z^2-z+\beta}F^{-1}(z)q + \frac{\beta z}{z^2-z+\beta}\varepsilon. \quad (B5)$$

One may note that the dewarper $F^{-1}(z)$ does not alter the nominal design relationships between $\gamma^*$, g, I and $\epsilon$ and the tracking error. On the other hand, by designing $F^{-1}(z)$ one can influence the impact that the quantizer has on performance. To be more precise, it follows directly from (B5) that the variance of the component of the tracking error which arises from q is given by:

$$J = \frac{\Phi_q}{2\pi}\int_{-\pi}^{\pi}|X(e^{j\omega})F^{-1}(e^{j\omega})|^2 d\omega, \quad (B6)$$

where:

$$X(z) \triangleq \frac{\beta z}{z^2-z+\beta}. \quad (B7)$$

A key point is that the variance of q depends upon the variance of v via (B2). From FIG. 2 and (B3) it follows that:

$$\begin{aligned}v &= F(z)(\gamma^* - (\varepsilon + z^{-1}\gamma)) \quad (B8)\\ &= F(z)\gamma^* - F(z)\varepsilon - z^{-1}F(z)\gamma\\ &= F(z)\left(\frac{z(z-1)}{z^2-z+\beta}\right)\gamma^* - F(z)\left(\frac{z-1}{z^2-z+\beta}\right)(g-I) -\\ &\quad \frac{\beta}{z^2-z+\beta}q - F(z)\left(\frac{z(z-1)}{z^2-z+\beta}\right)\varepsilon\\ &= F(z)Y(z)(\gamma^* - z^{-1}(g-I) - \varepsilon) - z^{-1}X(z)q.\end{aligned}$$

where X(z) is as in (B7) and where:

$$Y(z) \triangleq \frac{z(z-1)}{z^2-z+\beta} = \frac{z-1}{\beta}X(z). \quad (B9)$$

It is now assumed that $\epsilon^*$, g, I and $\epsilon$ are zero mean and independent. This allows for quantifying the variance of v via:

$$\Phi_v = \frac{1}{2\pi}\int_{-\pi}^{\pi}|F(e^{j\omega})Y(e^{j\omega})\Delta(e^{j\omega})|^2 d\omega + \frac{\Phi_q}{2\pi}\int_{-\pi}^{\pi}|X(e^{j\omega})|^2 d\omega, \quad (B10)$$

where $|\Delta(e^{j\omega})|^2$ is the power spectral density of $\delta$.

On the other hand, it follows from (B2) that $\Phi_v = \kappa\Phi_q$, so that (B10) yields:

$$\Phi_q = \frac{\tilde{\kappa}^{-1}}{2\pi}\int_{-\pi}^{\pi}|F(e^{j\omega})Y(e^{j\omega})\Delta(e^{j\omega})|^2 d\omega, \quad (B11)$$

where $$\tilde{\kappa}^{-1} \triangleq \left(\tilde{\kappa} - \frac{1}{2\pi}\int_{-\pi}^{\pi}|X(e^{j\omega})|^2 d\omega\right)^{-1} \quad (B12)$$

does not depend on F(z).

Substitution of (B11) into (B6) provides:

$$\begin{aligned}J = \tilde{\kappa}^{-1}&\left(\frac{1}{2\pi}\int_{-\pi}^{\pi}|X(e^{j\omega})F^{-1}(e^{j\omega})|^2 d\omega\right) \quad (B13)\\ &\left(\frac{1}{2\pi}\int_{-\pi}^{\pi}|F(e^{j\omega})Y(e^{j\omega})\Delta(e^{j\omega})|^2 d\omega\right).\end{aligned}$$

The above expression allows one to quantify the impact of the quantizer on closed loop performance. It depends upon the warper-dewarper pair used. Performance can be optimized by minimizing J in (B13). It can be shown, using the Cauchy-Schwarz inequality, that:

$$J \geq J^*, \quad (B14)$$

where:

$$\begin{aligned}J^* &\triangleq \frac{\tilde{\kappa}^{-1}}{\beta^2}\left(\int_{-\pi}^{\pi}|(e^{j\omega}-1)X^2(e^{j\omega})\Delta(e^{j\omega})|d\omega\right)^2 \quad (B15)\\ &= \tilde{\kappa}^{-1}\left(\int_{-\pi}^{\pi}\left|\frac{e^{j\omega}-1}{e^{2j\omega}-e^{j\omega}+\beta}\right|^2|\Delta(e^{j\omega})|d\omega\right)^2.\end{aligned}$$

This performance bound is tight and can be achieved by all warpers which satisfy (3) and (4).

REFERENCES

[1] H. Holma and A. Toskala, WCDMA for UMTS—Radio Access for Third Generation Mobile Communications. Chichester, UK: Wiley, 2000.

[2] G. C. Goodwin, D. E. Quevedo and E. I. Silva, "Architectures and Coder Design for Networked Control Systems", Automatica, vol. 44, No. 1, pp. 248-257, January 2008.

The invention claimed is:

1. A method for power control in a wireless communication system, comprising the steps of:
obtaining received signal power of signals transmitted over a wireless signal channel;
providing power control signals intended for power control of transmission over said wireless signal channel for obtaining a first targeted signal to interference level, based on obtained said received signal power;
quantizing signals based on said power control signals into quantized power control signals;
transmitting said quantized power control signals over a wireless control channel;
controlling a transmission power for said quantized power control signals over said wireless control channel to obtain a second targeted signal to interference level; and
warping said power control signals into warped power control signals by a first filter,
whereby said step of quantizing is performed on said warped power control signals, and
said first filter being a linear filter arranged for reducing an influence of quantization noise on the use of said power control signals.

2. The method according to claim 1, wherein said warping being based on a linear quantization error model with a prescribed signal to noise ratio.

3. The method according to claim 1, further comprising:
adapting said first filter to channel properties of said wireless signal channel.

4. The method according to claim 3, wherein said step of adapting in turn comprises the steps of:
obtaining a dynamic model of channel gain of said wireless signal channel; and
calculating said first filter for reducing said influence of said quantization noise based on said channel model.

5. The method according to claim 4, wherein said step of adapting further comprises the step of:
calculating a second filter to be used by a receiver of said power control signals for reducing said influence of said quantization noise based on said channel model;
said second filter being a linear filter arranged for reducing said influence of quantization noise;
said second filter being an inverse filter with respect to said first filter.

6. The method according to claim 4, wherein said step of obtaining a model of channel gain comprises estimation of a model of channel gain from said received signal power.

7. The method according to claim 5, wherein said step of adapting further comprises the steps of obtaining a model of interference of other users to said wireless signal channel, whereby said step of calculating said first and second filters is further based on said model of interference of other users.

8. The method according to claim 5, wherein said step of adapting further comprises the steps of obtaining a model of said first targeted signal to interference ratio, whereby said step of calculating said first and second filters is further based on said model of said first targeted signal to interference ratio.

9. The method according to claim 3, wherein said step of adapting is performed according to a trial-and-error approach.

10. The method according to claim 1, further comprising:
signalling data representing a second filter to be used by a receiver of said power control signals for reducing said influence of said quantization noise based on said channel model;
said second filters being a linear filter arranged for reducing said influence of quantization noise;
said second filter being an inverse filter to said first filter.

11. The method according to claim 10, wherein the step of signalling data representing said second filter comprises signalling data representing said channel model.

12. The method according to claim 4, wherein said step of adapting is performed continuously.

13. The method according to claim 4, wherein said step of adapting is performed intermittently.

14. A method for power control in a wireless communication system, comprising the steps of:
obtaining, in a first node of said wireless communication system, received signal power of signals transmitted from a second node of said wireless communication system over a wireless signal channel;
providing power control signals intended for power control of transmission over said wireless signal channel for obtaining a first targeted signal to interference level, based on obtained said received signal power;
quantizing said power control signals into quantized power control signals;
transferring said quantized power control signals over a wireless control channel from said first node to said second node;
controlling, in said second node, a transmission power for signals transmitted over said wireless signal channel in response to received power control signals; and
controlling, in said first node, a transmission power for said quantized power control signals over said wireless control channel to obtain a second targeted signal to interference level; and
warping, in said first node, said power control signals into warped power control signals by a first filter, whereby said step of quantizing is performed on said warped power control signals; and
dewarping, in said second node, said received warped and quantized power control signals into said power control signals used for controlling said transmission power for signals transmitted over said wireless signal channel by filtering said received warped and quantized power control signals by a second filter; wherein
said first and second filters being linear filters arranged for reducing an influence of quantization noise on said controlling of said transmission power for signals transmitted over said wireless signal channel; and
said second filter being an inverse filter with respect to said first filter.

15. The method according to claim 14, wherein said warping and said dewarping being based on a linear quantization error model with a prescribed signal to noise ratio.

16. The method according to claim 14, further comprising:
adapting said first and second filters to channel properties of said wireless signal channel.

17. The method according to claim 16, wherein said step of adapting in turn comprises the steps of:
obtaining a dynamic model of channel gain of said wireless signal channel; and
calculating said first and second filters for reducing said influence of said quantization noise based on said channel model.

18. The method according to claim 17, wherein said step of obtaining a model of channel gain comprises estimating of a model of channel gain from said received signal power.

19. The method according to claim 17, wherein said step of adapting further comprises the steps of obtaining a model of interference of other users to said wireless signal channel, whereby said step of calculating said first and second filters is further based on said model of interference of other users.

20. The method according to claim 17, wherein said step of adapting further comprises the steps of obtaining a model of said first targeted signal to interference ratio, whereby said step of calculating said first and second filters is further based on said model of said first targeted signal to interference ratio.

21. The method according to claim 16, wherein said step of adapting is performed according to a trial-and-error approach.

22. The method according to claim 14, further comprising:
signalling data representing said second filter from said first node to said second node.

23. The method according to claim 17, characterised by the further steps of:
signalling data representing said channel model from said first node to said second node;
whereby said calculating of said second filter is performed in said second node.

24. The method according to claim 17, wherein said step of adapting is performed continuously.

25. The method according to claim 17, wherein said step of adapting is performed intermittently.

26. The method according to claim 1, wherein said first filter has a frequency response satisfying:

$$|F_k(e^{j\omega})| = B_k^{-1} \sqrt{\left|\frac{1}{(e^{j\omega}-1)\Delta_k(e^{j\omega})}\right|}, \forall \omega \in [-\pi, \pi],$$

where $B_k$ is a positive real number and where $|\Delta_k(e^{j\omega})|^2$ is the power spectral density of at least one of said wireless signal channel, said target signal-to-interference level and said interference from other users.

27. A node for use in a wireless communication system, comprising:
controller device, arranged for power control of wireless channels in said wireless communication system;
said controller device comprising a receiver power control section;
said receiver power control section in turn comprising:
means for obtaining received signal power of signals received over a wireless signal channel of said wireless communication system;
power control signal unit connected to said means for obtaining received signal power;
said power control signal unit being arranged for providing power control signals intended for power control of transmission over said wireless signal channel for obtaining a first targeted signal to interference level;
quantizer arranged to quantize signal based on said power control signals into quantized power control signals;
transmitter connected to said receiver power control section and arranged for transmitting said quantized power control signals over a wireless control channel of said wireless communication system;
said controller device further comprising a transmitter power control section connected to said transmitter;
said transmitter power control section being arranged for controlling a transmission power for said quantized power control signals over said wireless control channel to obtain a second targeted signal to interference level,
wherein said receiver power control section further comprises:
a warper unit connected to said power control signal unit;
said warper unit comprising a first filter and being arranged for warping said power control signals into warped power control signals by said first filter,
whereby said quantizer is connected to said warper unit and performs quantization on said warped power control signals; and
said first filter being a linear filter arranged for reducing an influence of quantization noise on the use of said power control signals.

28. The node according to claim 27, wherein said warper unit being arranged for basing said warping on a linear quantization error model with a prescribed signal to noise ratio.

29. The node according to claim 27, wherein said receiver power control section further comprises: filter adaptor connected to said warper unit and arranged to adapt said first filter to channel properties of said wireless signal channel.

30. The node according to claim 29, wherein said filter adaptor is connected to said means for obtaining received signal power, arranged for obtaining a dynamic model of channel gain of said wireless signal channel, and arranged for calculating said first filter for reducing said influence of said quantization noise based on said channel model.

31. The node according to claim 30, wherein said filter adaptor is further arranged for calculating a second filter to be used by a receiver of said power control signals for reducing said influence of said quantization noise based on said channel model;
said second filter being a linear filter; and
said second filter being an inverse filter with respect to said first filter.

32. The node according to claim 30, wherein said filter adaptor comprises an estimator of a model of channel gain from said received signal power.

33. The node according to claim 31, wherein said filter adaptor is arranged to further base said first and second filters on a model of interference of other users to said wireless signal channel.

34. The node according to claim 31, wherein said filter adaptor is arranged to further base said first and second filters on a model of said first targeted signal to interference ratio.

35. The node according to claim 29, wherein said filter adaptor is arranged to operate according to a trial-and-error approach.

36. The node according to claim 27, wherein said transmitter is further arranged for signalling data representing a second filter to be used by a receiver of said power control signals for reducing said influence of said quantization noise based on said channel model;
said second filters being a linear filter; and
said second filter being an inverse filter to said first filter second filter.

37. The node according to claim 36, wherein said data representing a second filter comprises data representing said channel model.

38. The node according to claim 37, wherein said data representing a second filter further comprises data representing a model of interference of other users to said wireless signal channel.

39. The node according to claim 37, wherein said data representing a second filter further comprises data representing a model of said first targeted signal to interference ratio.

* * * * *

UNITED STATES PATENT AND TRADEMARK OFFICE
CERTIFICATE OF CORRECTION

PATENT NO. : 8,712,463 B2
APPLICATION NO. : 12/920678
DATED : April 29, 2014
INVENTOR(S) : Goodwin et al.

It is certified that error appears in the above-identified patent and that said Letters Patent is hereby corrected as shown below:

On the Title Page

Item (75), "Inventors", in Column 1, Line 3, delete "Torbjorn" and insert -- Torbjörn --, therefor.

Item (57), "ABSTRACT", in Column 2, Line 4, delete "unit (21)" and insert -- unit --, therefor.

In the Specification

In Column 4, Line 13, delete "FIG. 1 is a of a" and insert -- FIG. 1 is a --, therefor.

In Column 4, Line 58, delete "estimation 22," and insert -- estimation 24, --, therefor.

In Column 7, Line 7, delete "quantized power control signals 32" and insert -- quantized power control signals 45 --, therefor.

In Column 7, Line 13, delete "quantized power control signals 32" and insert -- quantized power control signals 45 --, therefor.

In Column 7, Lines 19-20, delete "quantized power control signals 34" and insert -- quantized power control signals 45 --, therefor.

In Column 7, Line 31, delete "quantized power control signals 34" and insert -- quantized power control signals 45 --, therefor.

In Column 7, Line 54, in Equation (2), delete "$F^k(z)$" and insert -- $F_k(z)$ --, therefor.

In Column 9, Line 23, delete "218" and insert -- 216 --, therefor.

Signed and Sealed this
Ninth Day of December, 2014

Michelle K. Lee
*Deputy Director of the United States Patent and Trademark Office*

CERTIFICATE OF CORRECTION (continued)
U.S. Pat. No. 8,712,463 B2

In Column 10, Line 46, delete "$\log_{10}(\overline{g}(l).$" and insert -- $\log_{10}(\overline{g}(l))$ --, therefor.

In Column 11, Line 20, delete "Ricean" and insert -- Rician --, therefor.

In Column 13, Line 50, delete "$\varepsilon^*$," and insert -- $\gamma^*$, --, therefor.

In the Claims

In Column 18, Lines 41-42, in Claim 36, delete "first filter second filter." and insert -- first filter. --, therefor.